United States Patent [19]

Tishler

[11] Patent Number: 5,718,372

[45] Date of Patent: Feb. 17, 1998

[54] TEMPERATURE CONTROLLER

[76] Inventor: Carl Tishler, 7836 Dorchester Rd., Boynton Beach, Fla. 33437

[21] Appl. No.: 819,588

[22] Filed: Mar. 17, 1997

[51] Int. Cl.[6] .................. F25B 29/00; F24D 5/00
[52] U.S. Cl. ................... 236/11; 165/240; 392/349
[58] Field of Search ............ 236/49.31 F; 165/240; 392/349

[56] References Cited

U.S. PATENT DOCUMENTS

| 4,353,409 | 10/1982 | Saunders et al. | .......... 165/240 |
| 5,488,218 | 1/1996 | Olsen et al. | .......... 165/240 X |

*Primary Examiner*—William E. Wayner
*Attorney, Agent, or Firm*—Malin, Haley, DiMaggio & Crosby, P.A.

[57] ABSTRACT

A supplementary thermal system controller for assisting a main system controller in retaining a desired temperature rise by monitoring the temperature in the return duct, wherein the supplemental controller comprises a microcontroller for reading and processing return duct temperature measurements, a signal conditioner circuit for preparing temperature related signals for processing by the microcontroller, processor readable medium of program code for determining the rate of temperature change in the return duct and providing control signals based on the rate of temperature change, and a supplemental thermal source driver for controlling a supplemental thermal source, such as electrical resistance heating elements, to cause the assisting temperature source to increase or decrease its thermal output.

24 Claims, 6 Drawing Sheets

APPLICATIONS OF THE CONTROLLER

| APPLICATION | MONITORED | REGULATED BY CONTROLLER | TO PRODUCE IN ROOM |
|---|---|---|---|
| (1) HEAT PUMP, AIR DUCT, SUP HEAT | RETURN AIR DUCT OR ROOM AIR | RESISTANCE ELEMENTS | CONTROLLED RATE OF TEMPERATURE RISE OR FALL |
| (2) AIR COND, AIR DUCT, SOLE HEAT | | | |
| (3) HEAT PUMP, HYDRONIC | | WATER TEMP, CONVECTOR AREA, CONVECTOR AIR FLOW | |
| (4) FURNACE, HYDRONIC | | | |
| (5) FURNACE, HEAT PUMP, AIR COND, AIR DUCT | | VOLUME OF AIR | |

Fig. 7

TEMPERATURE CONTROLLER

BACKGROUND OF THE INVENTION

1. Field of the Invention

This invention relates generally to heat pumps that use supplementary temperature sources, such as electrical resistance heating elements and, more particularly, to an electronic controller and system for predictably and automatically controlling the rate of temperature change in a room by selectively energizing and deenergizing supplementary thermal response elements, such as electrical resistance heating elements, to change their thermal output based on the rate of temperature change in a room, as measured in the return ducts. The instant invention may also be used to control other temperature sources, such as resistive elements in central air conditioning systems, water source temperature in hydronics, fan speed, convector area and air flow.

2. Description of the Prior Art

Heat pumps require supplemental temperature sources to assist in meeting the heating demands which exceed the system's capacity. Conventional systems fail to efficiently use supplemental heating sources, such as electrical resistance heating elements, to control the rate of temperature change in buildings. Heat pumps are used mostly in moderate climates which require a balance between heating and cooling, and use auxiliary heating elements when the heat pump alone cannot meet the heating demand. In hotter regions, expensive heat pumps are not warranted, so central air conditioning systems are used for heating and cooling a building. Central air conditioning systems typically use electrical heating elements as their sole source of heating since the demand for heat is low and seldom required. In heat pump and central air conditioning systems, electrical resistance heating elements are installed in the ducts downstream from a fan and adjustably energized when a heat source is needed. In other systems, such as hydronics, a water source is heated or cooled, based on auxiliary source requirements. The problem with conventional systems, however, is that the supplemental heating sources for heat pumps and the sole heating source for air conditioners are inefficiently controlled and regulated.

When in the heating mode, the heat pump is more efficient than electric, gas, or oil fired systems under moderate temperature conditions, and is therefore preferred. As the temperature outside drops below freezing, typically the output of the pump becomes insufficient to satisfy the desired heat set point and must be supplemented with electrical resistance heating elements. In most installations, electrical resistance heating elements are installed in the central duct and air is blown over them with a fan to introduce an additional source of heat into the conditioned air medium. The electrical resistance elements comprise multiple stages which are selectively energized based on outside temperature to meet temperature conditioning demands. While they provide the additional heat needed to reach desired set points, electrical resistance elements consume high energy and are thus inefficient and costly. Consequently, it is undesirable to energize the auxiliary heating elements unless absolutely necessary. Yet, the manner in which electrical resistance elements are added to supplement heating needs remains inefficient.

Resistance elements are usually energized when the outside temperature drops to a predetermined temperature. In prior art systems, resistance elements are added at predetermined outside temperatures based upon the rated output of the heat pump and the calculated "worst case" heat loss of the building. For instance, in U.S. Pat. No. 4,353,409, issued to Saunders et al., the controller measures outside ambient temperature to determine the heating capacity of an ambient air source heat pump relative to the outdoor ambient air temperature and to energize and de-energize the various heating stages as appropriate to meet heating demands based on these outside measurements. In many other systems, two or three outside temperature sensors are usually used to bring in progressively larger heating elements as the outside temperature drops and the heating demand exceeds the capacity of the heat pump. This method of introducing supplemental heating stages does not take into consideration the actual setting of the thermostats, the rate of temperature change, or the actual heat loss of the building, but rather relies on estimates of the system capacity and potential heat loss from the building based on outdoor temperatures. This method of supplying supplementary heat has been found to be wasteful, highly inefficient, and uncomfortable.

Heat pumps, supplementary heating systems, and similar thermal response systems are triggered by thermostats at preselected set points. Many thermostats use a single stage of heating. When a single-stage thermostat calls for heat, a single relay controls both the heat pump and the supplementary resistance heating elements. These heating elements are energized when the outside temperature falls below the set point of the outside temperature sensing device. This method of energizing supplemental heat is based on estimated worst case heat loss. The heat loss of a building, however, is dependent on factors other than outside temperature, and the "worst case" conditions related to heat loss seldom prevail. For instance, heat loss is greater on a cloudy, windy day than on a calm, sunny day at the same temperature. Heating requirements are also dependent on the number of zones calling for heat, heat generated within the building, the thermostat setting and the actual total heat loss of the building. These things are not considered in conventional controller systems. Since conventional systems are more concerned with accounting for "worst case" heat loss conditions, the inefficient electrical heating elements are often introduced unnecessarily when the heat pump alone is capable of meeting the heating requirements. These problems result in uncomfortable temperature changes in the room.

Two-stage thermostats are also used for heating. The first stage turns on the heat pump at the temperature set point. After a fixed temperature differential between the stages, the second stage turns on the heating elements at the lower temperature. One type of multi-stage thermostat may be found in U.S. Pat. No. 4,387,763, issued to Betton, wherein the auxiliary stages are energized within a predetermined period of time in situations where the heat pump is unable to satisfy the heating load. In U.S. Pat. No. 4,353,409, one or more stages of heating are energized, when a differential temperature between the supply and return air indicates that the current heating capacity is inadequate. Neither system employs auxiliary stages based on actual heat loss of the building or the rate of temperature change. In multi-stage thermostats, a set amount of resistance heating is brought in at a predetermined outside temperature as described above. The inefficient use of the elements is solved partially by limiting their use until the room temperature drops a fixed amount below the lower limit of the first stage. This insures that the heating elements will not be used if the heat pump can do the job alone. The use of the two stages of heating, however, provides poor temperature control, whereby the on/off differential of the thermostat is effectively doubled. In addition, in most conventional systems, supplementary resistance heating elements are needlessly energized based on outside temperature rather than actual heat loss. Conversely, known systems do not always introduce supplemental heat when needed because of the reliance on estimated conditions.

Conventional thermostat controls incorporate anticipation circuits to limit heating overshoot that occurs after the heating system is de-energized. As a room reaches the desired temperature, the heat pump and any supplementary heat elements are turned off. However, in order to prevent burning out the auxiliary heat elements, the fan continues to run for a predetermined period of time, thereby creating the temperature overshoot. That is, the room continues to heat due to the residual heat in the heat pump coils, heating elements, and ducts, causing the temperature to increase above the thermostat setpoint. To overcome this overshoot problem, most modern thermostats incorporate an anticipation circuit. Anticipation circuits typically include a small heating element in the thermostat which is activated together with the thermostat to provide a fixed amount of heat to the thermostat. This causes the thermostat to be satisfied prematurely in anticipation of the overshoot or residual heat so that the room will coast up to the desired setpoint temperature. The anticipation circuit is preset, by design, based on average heat loss conditions of the building. Therefore, during conditions other than average, the anticipation circuit either overcompensates or undercompensates. During very cold weather, the residual heat has less of an effect on overheating a room, while the residual heat overshoots the desired temperature during mild weather conditions. For instance, if the anticipation circuit is set for the more common mild weather conditions, there may be a difference of five or six degrees Fahrenheit between the thermostat setting and the actual temperature of the air reaching the thermostat when it shuts off during very cold weather conditions.

Another problem with conventional heat pump installations is that it is difficult to control the rate at which a room is heated. This is especially troublesome when operating without supplementary heat at cooler temperatures. It is also a problem when incrementally increasing the heating element size, since it takes longer for the thermostat to be satisfied under these conditions. At other times, the heating is too fast. In either event, the inability to accurately control the rate of temperature change in a building causes discomfort to its occupants. If a controller could dictate the rate of temperature change based on actual heat loss in the structure at low outside temperatures, then the entire system would improve the response to varying heat loss from the building, overshoot and undershoot, and would be more efficient, less costly to run, and better suited for providing a comfortable environment. As no system is currently known that can predictably and automatically control the rate of temperature change in a building, there exists a need for a supplementary thermal controller that only introduces auxiliary or supplemental thermal elements when needed.

Several systems are contemplated in the background art for controlling the operation of supplemental electric heaters. However, none of these references solve the above-noted problems. For example, U.S. Pat. No. 4,387,763 discloses a system which energizes auxiliary heat if the heat pump is unable to satisfy the heating load within a predetermined period of time. U.S. Pat. No. 4,353,409 teaches another system which employs auxiliary heat based on outdoor ambient temperature and temperature differentials between the supply and return ducts. Sumner, Jr. et al., in U.S. Pat. No. 4,265,298, comprises a microcomputer control that prevents operation of the supplemental heater so long as the lower night set-back temperature can reach the higher reference set point during the daytime within a predetermined amount of time. In U.S. Pat. No. 4,702,305, Beckey et al., teaches a temperature control system comprising a microcomputer based thermostat that operates a heat pump and auxiliary heat source at different ramp rates. The foregoing art teach systems which are based on outdoor temperature measurements, current system capacity, and predetermined time settings and fail to address the need for controlling the rate of temperature change in a building based on actual heat loss. By way of contrast, the instant invention accurately controls and monitors the rate of temperature change in a building or room by providing a supplementary heating system controller that takes into account the actual heat loss of a building and the true temperature of a room based on feedback from return duct temperature sensors.

The above-noted background art neither solves nor addresses the problems contemplated by the instant invention. There remains a need for a temperature heating controller that controls the temperature in a building based on the actual heat loss rather than relying on a heat pump's listed capacity and the projected heat loss from a building as determined by outside temperatures. There also exists a need for supplementary temperature controller that can be adapted for use with other auxiliary systems, such as hydronics, central air conditioning systems, and other systems which use a thermal source. The present invention solves these problems by providing a temperature controller that controls the rate of temperature change by selectively energizing and deenergizing auxiliary electrical resistance heating elements based on the actual heat loss of a building as determined by return duct or room temperature measurements over a predetermined period of time. The instant invention is preferably adapted for use with heat pump systems employing electrical resistance elements for supplemental heating, but is also adaptable for use in central air conditioning systems, hydronic systems and other systems.

SUMMARY OF THE INVENTION

In light of the foregoing, it is an object of the instant invention to provide a supplementary or sole thermal system controller for improving the operating characteristic and efficiency of heat pumps, air conditioners and other systems which use electrical resistance heating elements for heating.

It is another object of the instant invention to provide a thermal system controller for use in hydronic systems to control thermal sources such as water temperature, fan speed and convector area.

It is an additional object of the instant invention to provide a thermal system controller that is useable for any supplementary or sole temperature source for improving the efficiency and operating characteristics of heat pumps, air conditioners and hydronic systems during both cooling and heating operations.

It is a further object of the thermal system controller of the instant invention to control the rate of temperature change in a building, room or zone based on the measured temperature of the air in or near the return ducts rather than on estimated heat loss or outside temperatures.

It is still another object of the instant invention to provide a thermal system controller for assisting a main air conditioning system in producing a control rate of temperature change in a building or zone.

It is yet a further object of the instant invention to provide a thermal system controller that supplies an amount of heating or cooling energy based upon the true heat loss of the entire building at a regulated, comfortable rate.

It is yet an additional object of the instant invention to provide a thermal system controller that efficiently activates thermal sources, such as resistant heating elements, only when absolutely necessary to insure the rate of temperature change falls within pre-designed limits.

It is still a further object of the instant invention to provide a thermal system controller that can accommodate a plurality of zones without experiencing a deterioration in operating characteristics.

It is still a further object of the instant invention to provide a thermal system controller that employs a microcontroller and memory for automatically activating the correct amount of resistance heating elements or other thermal sources instantly each time a new combination of zones is activated.

It is yet another object of the instant invention to provide a heating thermal system controller which is entirely solid state and requires no moving mechanical parts.

It is still another object of the instant invention to provide a thermal system controller which is cost effective and adaptable for use in existing air conditioning systems.

Based on the foregoing, the instant invention provides a temperature controller which may be used with any air conditioning system, such as heat pumps, stand alone central air conditioning systems, and any system which uses resistance heating elements in air ducts to supplement or solely produce the heat provided by the air conditioning system for improving the overall operating characteristics and efficiency of the system. The controller generally comprises a microcontroller, electronics for simulating temperature differentials and processor readable medium of program code for determining the rate of temperature change in the zone or building being monitored for controlling the application of the supplemental or sole temperature source. For purposes of discussion, the temperature/thermal source typically comprises electrical resistance heating elements. The controller works by monitoring the temperature in the return ducts when the thermostat calls for heat and activates the heating elements to achieve a predetermined rate of temperature change. Although the preferred embodiment of the controller embodied by the instant invention is described with respect to supplementary heating applications for heat pump systems, the controller can be used for both heating and cooling applications in heat pump systems, central air conditioning systems and hydronic systems. For instance, in a hydronic system, when a thermostat activates the system, the controller monitors the room temperature, and based on the room temperature and rate of change therein, controls the water temperature, area of convecting surfaces or the volume of air flowing over the convecting surfaces to produce a desirable rate of temperature change in the room. The controller of the instant invention comprises a smart system which supplies the exact amount of heating (or cooling) to compensate for the true heat loss (or gain) based upon the temperature change in the building or zone.

The supplementary temperature system controller comprises a microcontroller, temperature sensing assembly for receiving at least one signal from at least one temperature sensor, a temperature response assembly for initiating control signals to selectively activate the temperature source, signal conditioning circuitry interfacing with the microcontroller and a microcontroller/processor readable medium of program code including algorithms for measuring temperature differentials over a measurable period of time, storing data, determining rate of temperature change in a zone and initiating control signals. The supplemental temperature source in the preferred embodiment preferably comprises at least one electrical resistance heating assembly for use in supplementing the heat source. As noted above, however, the temperature source may also comprise any thermally controlled fluid, variable fan, convector surface, or any other unit used for heating or cooling requirements.

In the preferred embodiment, the controller is used with heat pumps for controlling electrical resistance heating elements stored in a duct system for which temperature conditioned air is distributed. When a thermostat calls for heat, the temperature of the air in the return duct is monitored by the temperature sensor and received by the temperature sensing assembly so that the required amount of heat as determined by the microcontroller can be adjusted quickly, at a predetermined rate, to produce a managed rate of temperature increase whenever the rate of temperature increase drops below a designated limit. This method of supplementary heat control is based on return duct temperatures rather than outside temperatures, resulting in improved efficiency and increased comfort over conventional methods.

The supplemental thermal controller is designed for use with a plurality of temperature sensors and supplemental thermal sources for controlling the temperature and rate of temperature change in a plurality of zones. The temperature sensing assembly interfaces the temperature sensors and microcontroller while the temperature response assembly interfaces the controller and the supplemental thermal source being controlled. The system is compatible with conventional thermostats and zoning controls and requires only a single stage for heating. The controller of the instant invention inherently improves the operation of anticipation circuits because of the ability to control the rate of temperature change in a room. The instant invention is also adaptable for multi-zone operation and may be used to control one or more resistance heating assemblies. As the instant invention provides memory, a microcontroller and program code, each time a new combination of zones become active the correct amount of heating or cooling elements can be activated automatically. Once a supplementary thermal element or source is activated, precise control rapidly and comfortably achieves the desired temperature in the room or zone. Precise control is obtainable when there is a large difference in heat losses among a plurality of zones in a building. A plurality of heating element assemblies, or supplemental thermal sources, each with a corresponding temperature sensing device, can be used with a single controller whereby the controller scans the zones and sets each heating element assembly individually for the desired rate of temperature rise. The instant invention also includes a quick response circuit which can be activated when there is a large change in temperature setting. The control of the instant invention improves the operating characteristics of any heat pump system, central air conditioning system or hydronic system and is adapted for use in existing systems.

In accordance with these and other objects which will become apparent hereinafter, the instant invention will now be described with particular reference to the accompanying drawings.

DESCRIPTION OF THE PREFERRED EMBODIMENTS

With reference to the drawings, FIGS. 1–7 depict the preferred embodiments and use of the instant invention which is generally characterized by the referenced numeral 10. The supplemental thermal system controller 10 (also referred to herein as "controller") of the instant invention is preferably used with heat pumps and central air conditioning systems which employ resistance heating elements 30 in the air ducts. The controller controls the operation of these elements 30 for enhancing the operating characteristics and efficiency of the overall system. The thermal system controller 10 monitors and controls the rate of temperature change in a room, or zone 50, by monitoring the temperature in the return duct (denoted in FIG. 2 by reference character "R"). Compared to prior art systems which monitor outside temperature and project heat loss, as discussed above, the instant invention 10 offers a vast improvement in the temperature control of the buildings in the heating mode at lower outside temperatures.

The controller 10 comprises a microcontroller operated smart system which supplies the exact amount of heating required to compensate for the true heat loss of the building/zone 50, as determined by the rate of temperature change in the zone 50. Generally, with reference to FIGS. 1 and 2, when the thermostat and the air conditioner or heat control panel 32 calls for heat, the controller 10 is activated and the temperature in the return duct "R" is measured by the temperature sensor 28 and the amount of heat provided by the resistance heating elements 30 are adjusted based on the calculated rate of temperature change in the room. These heating elements are adjusted, added or removed to provide the supplemental heat required to assist the main heating system 32 so as to produce a managed rate of temperature increase in the zone 50. This occurs under low temperature operating conditions that are unmanageable by the heat pump alone.

In the heating mode, the heat pump 32 uses supplementary heating 30 at low outside temperatures. When the thermostat calls for heat the temperature in or near the return duct R is monitored. The value of the resistance heating elements 30 is adjusted to produce a managed rate of temperature increase whenever the rate of temperature increase produced by the heat pump drops below a design limit. During mild weather when the heat pump is controlling solely there is no control of the rate of temperature increase.

Figure 6:
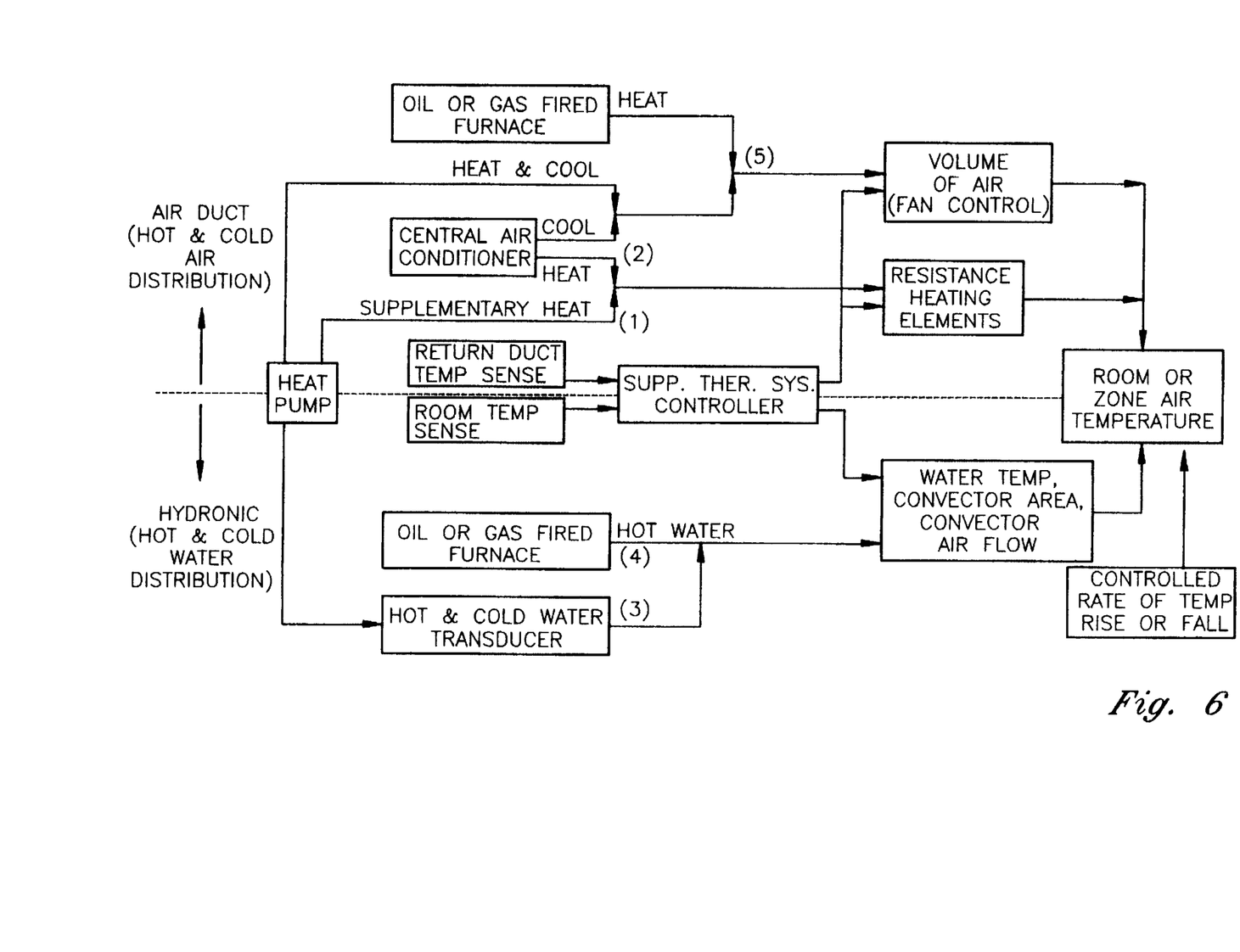
FIG. 6 is an application diagram illustrating the controller of the instant invention as used in a variety of heating and cooling systems.
Figure 7:
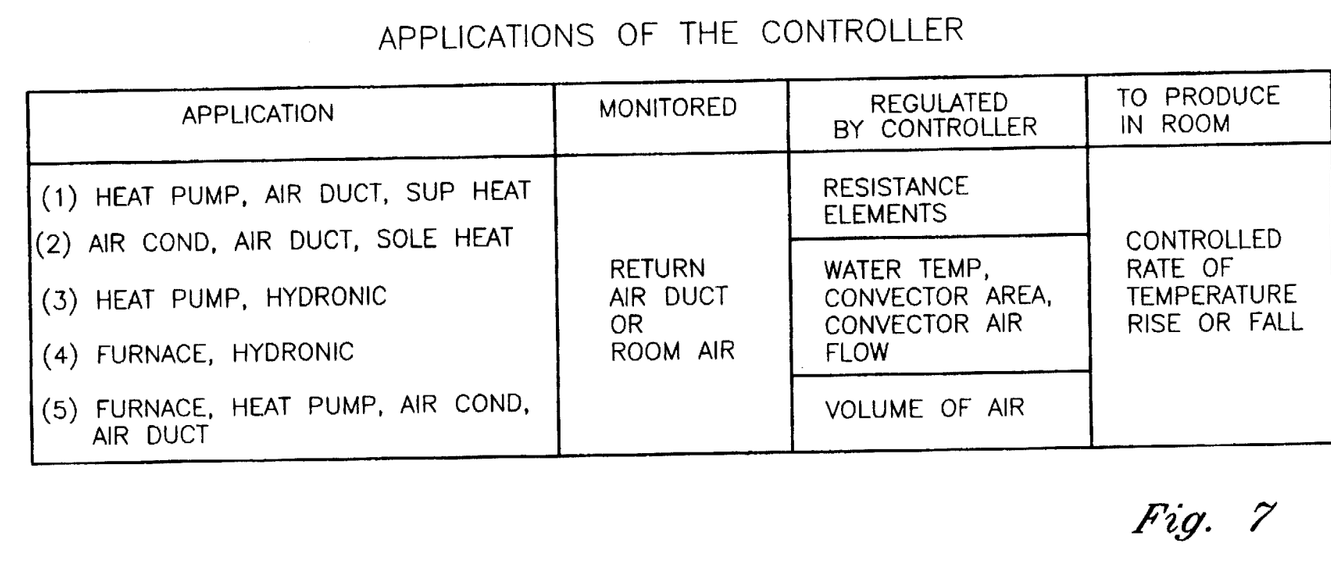
FIG. 7 is an applications chart depicting the various applications of the instant invention in various heating and cooling systems.

Although the instant invention 10 is described herein with respect to heating and providing supplemental heating requirements with electrical resistance heating elements 30, the instant invention 10 is also operational in the cooling mode and in other temperature controlling systems, such as hydronics, central air conditioner systems and heat pump systems. Example of these uses are shown in FIGS. 6 and 7. When the controller 10 is used with an air conditioner in a heating mode the resistance heating elements provide the sole source of heat. The value of the heating elements is adjusted to produce a managed rate of temperature increase when the system is in the heating mode. The controller 10 may also be used to vary the air flow for heat pumps and air conditioners in an air duct system to control the rate of temperature change whenever the system is on. When controlling the water temperature or area of convection sources, the controller 10 operates continously. In systems that employ air convectors, the air flow can be controlled continuously under all operating conditions to produce a managed rate of temperature change. The temperature of the air is monitored in the room, usually near the thermostat, as there are no ducts and the thermal energy is distributed by water pipes. Thus, the instant invention 10 may be used with most air temperature control system which use a supplemental thermal source 30 for complementing the main system. Accordingly, the electrical resistance heating elements 30 may be generally referred herein as a supplemental thermal source 30.

The controller 10 is designed as a single control unit 10 for use with any supplemental thermal source 30 in a multi-zone operation assembly and is therefore compatible with conventional thermostats and zoning controls 32, as known in the art. The instant invention 10 improves the operating characteristics of new and existing systems by facilitating additional thermal energy when the main system approaches or exceeds its capacity. The supplemental thermal system controller 10 can accommodate a plurality of zones 50. In any multi-zone environment, the controller 10 continuously monitors all zones 50 to determine whether new zones 50 are being activated or are calling for heating. Since the controller 10 comprises a smart system and has memory 13 for storing information, such as prior supplemental thermal source requirements in a particular zone 50, each time a new combination of zones 50 becomes active the optimal amount of heating elements 30 (or supplemental thermal source) are automatically activated as previously recorded by the controller 10. These and other features are discussed in more detail below.

Figure 1:
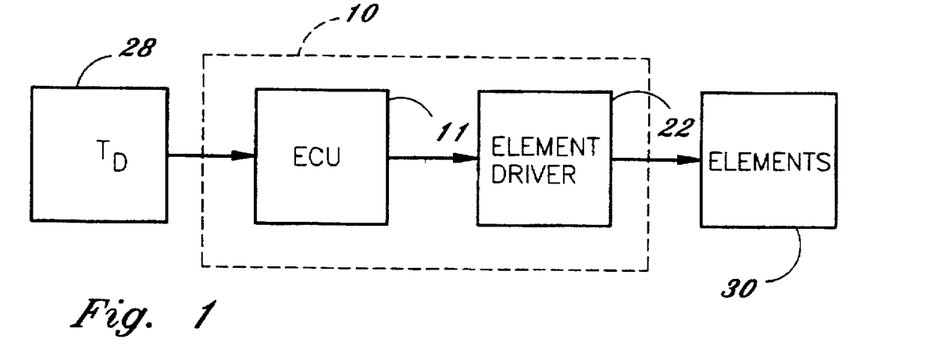
FIG. 1 is an electrical block diagram of the controller and system of the preferred embodiment of the instant invention.

With reference to FIG. 1, the supplementary thermal system controller 10 generally comprises an electronic control unit 11 and one or more element drivers 22 which are driven by the electronic control unit 11. The electronic control unit 11 receives successive temperature related signals from at least one temperature sensor 28 and converts them into a microcontroller or processor readable electronic temperature reading which are compared and processed to arrive at a rate of temperature change within the target zone. Based on these measurements, the electronic control unit 11 either activates or deactivates the element driver 22. The element driver or drivers 22 energize or drive the supplemental thermal source 30, or in this particular example the electrical resistance heating elements 30, so as to complement the main system in controlling room temperature at a managed rate. The sources or elements 30 are de-energized in the same manner. The rate at which temperature is increased or decreased is pre-selected based on programming of the microcontroller 12 so that temperature change is achieved at a comfortable rate that goes practically unnoticed by the occupants. The system version of the invention may include the temperature sensors 28 and/or supplemental thermal elements 30. The temperature sensors 28 and supplemental thermal source or elements 30 may comprise any conventional sensors and elements known in the art.

Figure 2:
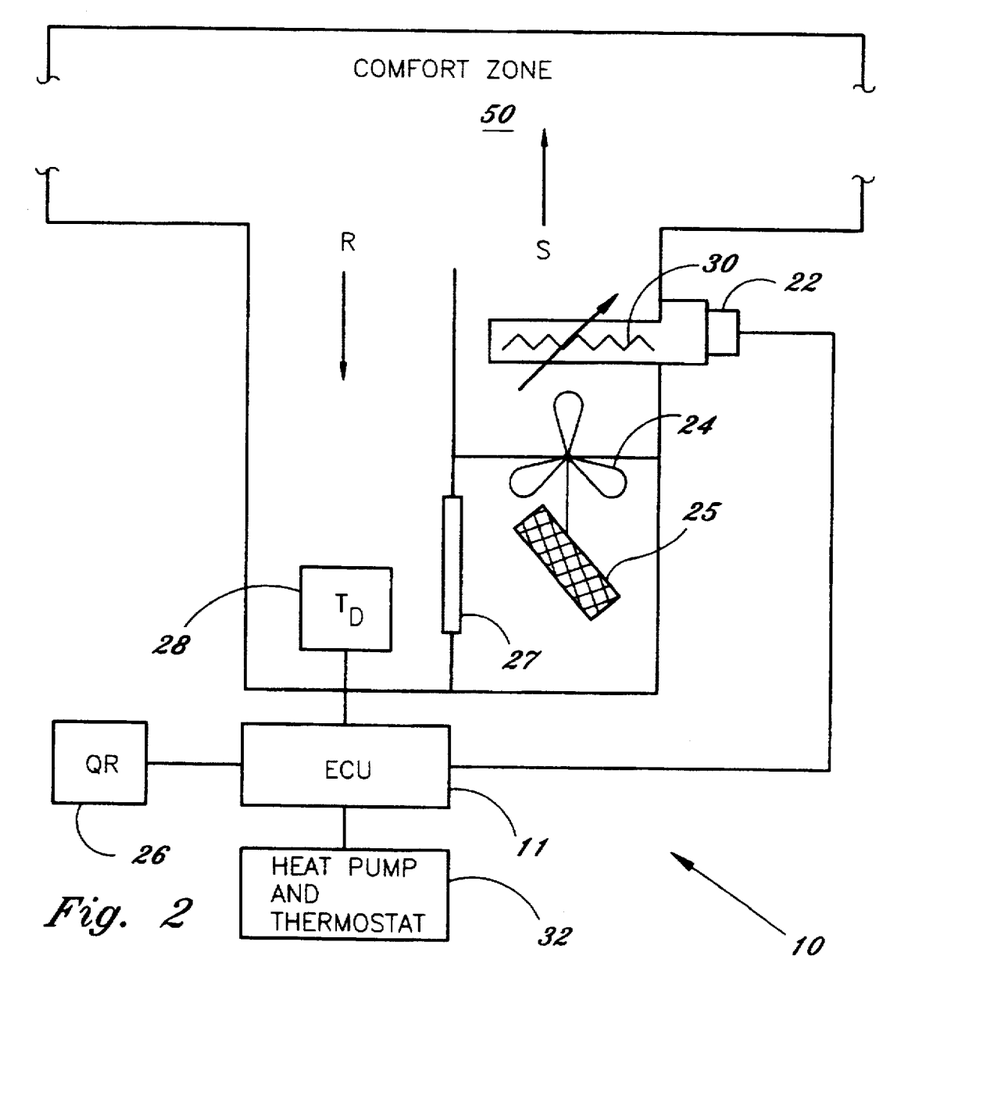
FIG. 2 is a system block diagram a simplified model of the instant invention as installed and used in an air conditioning system relying on electrical resistance heating elements for a supplementary source of heat.

Referring to FIG. 2, the controller 10 of the instant invention works essentially independent of the overall system after it is triggered by the main system thermostat 32. Consequently, the controller 10 is adapted for use with any existing or new heating/cooling system. An application of the instant invention is shown in FIG. 2. The system of the invention as illustrated, preferably comprises the electronic control unit 11, the electrical resistance heating elements 30 (supplemental thermal source or elements), the element drivers 22 (temperature response assembly), at least one temperature sensor 28 (temperature sensing assembly) and a quick response switch 26. The electronic control unit 11 is electrically connected to the thermostat 32 for activating and deactivating the electronic control unit 11. The supplementary thermal system controller 10 generally comprises electronic control unit 11, temperature response assembly 22 and a means for receiving the temperature sensor 28 generated signals as partially defined by the temperature sensing assembly. As shown in FIG. 2, the temperature sensing assembly comprises at least one temperature sensor 28 installed in a return duct "R" for sensing the true, current zone temperature. A plurality of zones 50 may be monitored in this manner by placing a temperature sensor 28 in each respective return duct "R". Readings from these temperature sensor 28 are manipulated by the microcontroller 12 and program code 100 for dictating use of the supplemental thermal source 30. The temperature sensing assembly may also include a sensor 28 and electronic control unit 11 interface and program code for receiving the temperature related code for processing. The electronic control unit 11 receives the temperature related signals from the sensors 28 and processes the signals for selectively energizing the temperature response assembly 22, 30.

Figure 5:
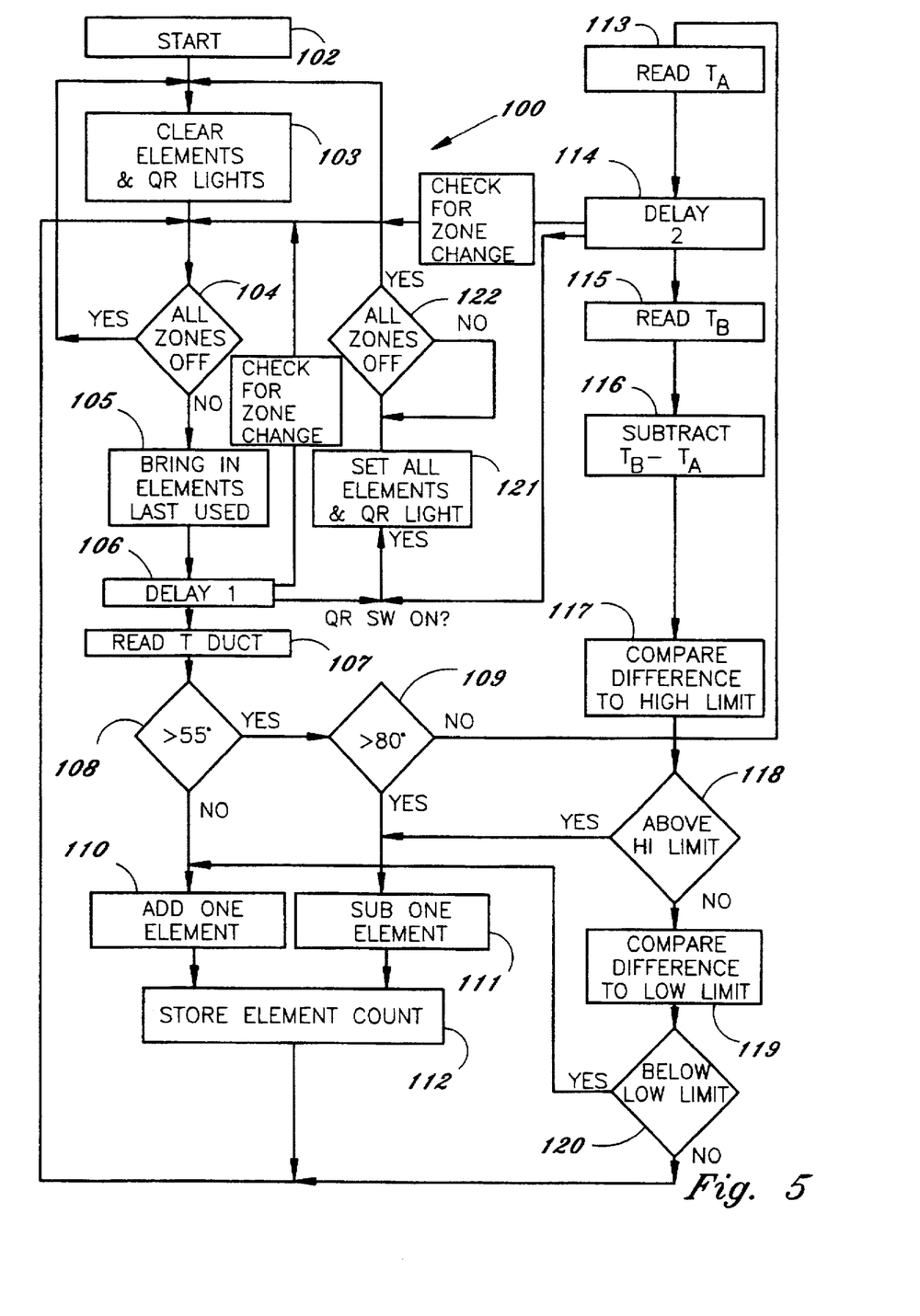
FIG. 5 is a flow chart of the basic program code of the preferred embodiment of the instant invention illustrating the decision logic in adding and removing supplementary thermal elements.

The temperature response assembly generally comprises a supplemental thermal source 30, the element driver 22 and the interface between the driver 22 and electronic control unit 11. The supplemental thermal source 30 is placed in the supply duct "S" down stream from the fan 24, fan coil assembly 25 and air filter 27. The driver 22 and unit 11 interface may comprise any conventional control signal transferring means known in the art. The supplemental thermal source 30, preferably comprises electrical resistance heating elements 30 which are selectively activated, deactivated and adjusted by the element driver 22 to provide the required secondary heat as dictated by the electronic control unit 11. The electronic control unit 11 outputs the control signals to the element drivers 22 based on the calculated zone 50 requirements. A quick response switch 26 is also provided for causing all response elements 30 to be activated when the switch 26 is actuated. The quick response switch 26 is electrically connected to the electronic control unit 11 and energizes the circuit in the electronic control unit responsible for activating all supplemental thermal sources or elements 30. The quick response switch 26 may be a manually operated switch or it may comprise an automatic switch which is triggered based on predetermined parameters, such as zone 50 temperature as measured in the return direct R. Once all the elements 30 are activated, they are deactivated in the manner dictated by the program code 100, as seen in FIG. 5.

The installation of the controller 10 and a complete system is shown in FIG. 2. It requires inserting a temperature sensing assembly or sensor 28 in the return duct "R" and mounting the electronic control unit 11 in the same vicinity. The cable is routed to the resistance element drive unit 22 which is mounted on the electrical resistance heating assembly 30 for setting the value of the resistance heating elements 30 as dictated by the controller 10. Wires run to the quick response switch 26 which is conveniently placed in the zone 50 and to the main thermostat, "fan-on" terminals and the heat pump/air conditioner control panels 32.

Figure 3:
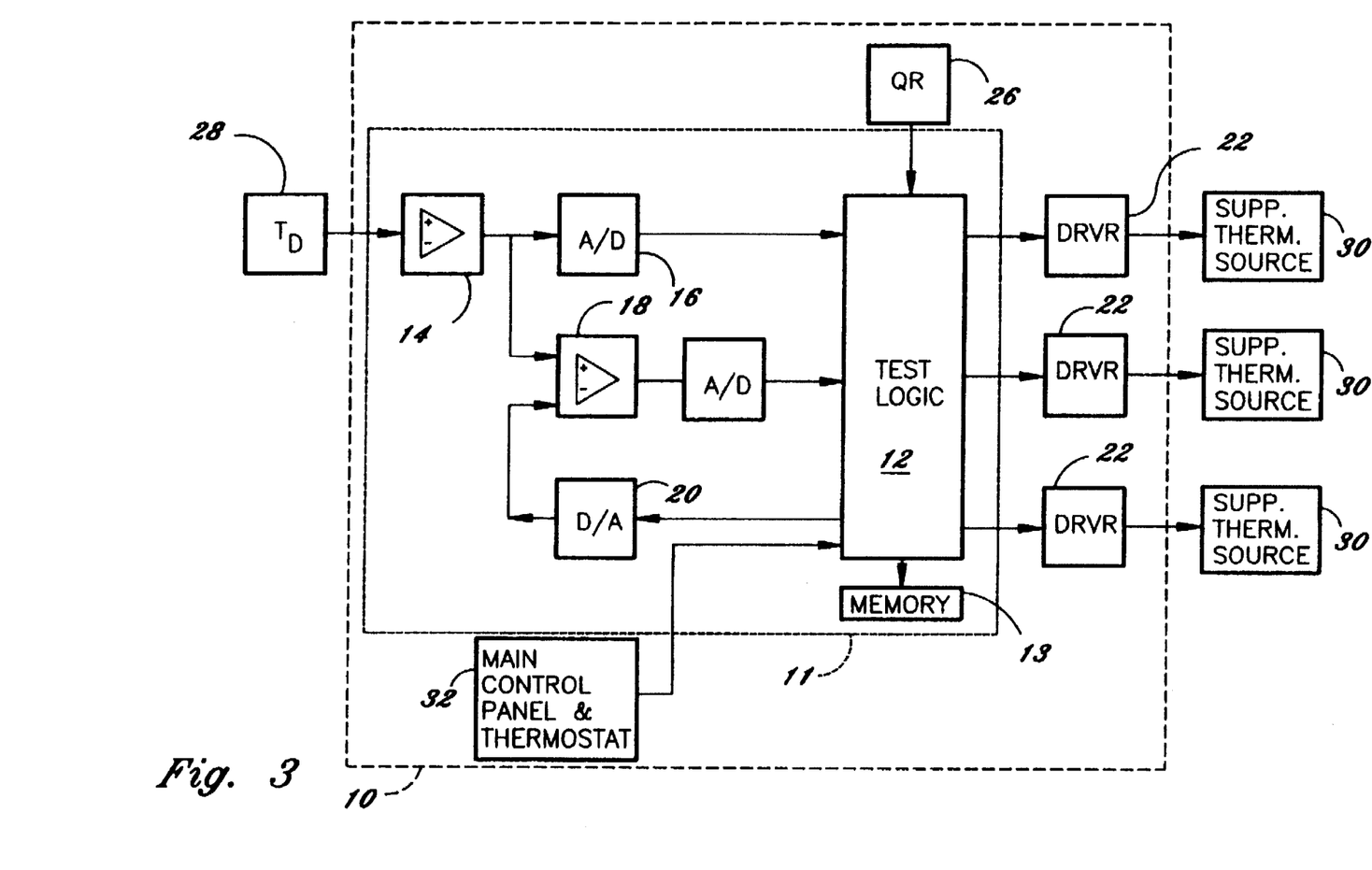
FIG. 3 is an electrical block diagram of the controller of the instant invention.
Figure 4:
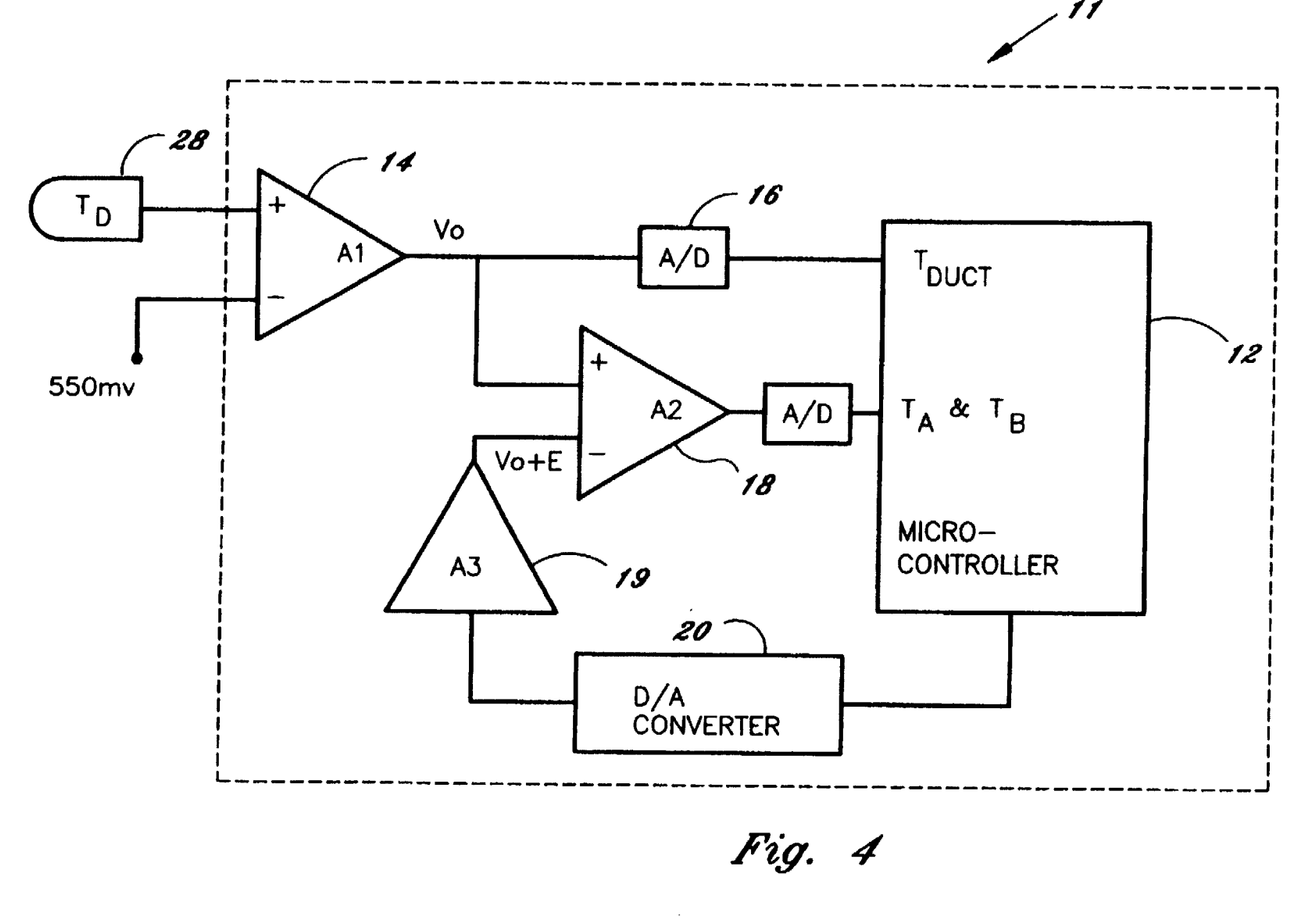
FIG. 4 is a simplified electrical schematic of the microcontroller and amplifiers as used in the preferred embodiment of the controller of the instant invention.

A more detailed view of the electronic control unit 11 is shown in FIGS. 3 and 4. The electronic control unit 11 generally comprises a signal amplifier means 14, 18, digital-to-analog (D/A) 20 and analog-to-digital (A/D) 16 converters, memory 13, a microcontroller/processor 12, output means and processor readable medium of program code 100 (shown in FIG. 5). The amplifier means comprises a first differential amplifier 14 and a second differential amplifier stage 18. The first differential amplifier 14 receives the duct temperature related signal $T_D$ from the temperature sensor 28 and a constant voltage input, e.g. 550 mv, and outputs a signal to the second amplifier stage 18 and the microcontroller 12. This signal is representative of the return duct temperature. Based on this and successive temperature readings, the microcontroller 12 and program 100 decide whether to do nothing or to activate or deactivate the supplemental elements 30. The second amplifier stage comprises a feed back amplifier 19 and a differential feedback amplifier 18. The feedback amplifier 19 amplifies a feedback signal ($V_O+E$) from the microcontroller 12 and the D/A converter 20 for processing by the differential feedback amplifier 18. The differential feedback amplifier 18 receives the output from the first differential amplifier 14 and the second amplifier 19 and outputs a differential signal to the microcontroller. These outputs are compared and processed by the microcontroller 12, as shown in FIG. 5. The microcontroller 12 reads and processes the amplifier 18 outputs to determine the temperature difference between successive measurements and the rate of temperature change based on these readings over a known period of time.

The quick response switch 26 can be manually activated when a large change is made in the temperature setting. Once activated, the zone 50 quickly reaches the desired setpoint temperature by activating all supplemental thermal elements 30 until the heat thermostat shuts off the heat pump or main system. A small sacrifice is made in accuracy of operation and efficiency for a limited number of cycles and normal operations presume thereafter. The quick response switch 26 may also comprise an automatically actuated switch which is triggered when the temperature difference between the setpoint and actual zone temperature exceeds a predetermined range.

The supplemental thermal system controller 10 preferably comprises a multi-zone system whereby it controls the rate of temperature change in a plurality of zones 50. The controller 10 provides precise control in situations where there is a large difference in heat losses among the zones 50 and manually balancing the air flow between these zones provides insufficient comfort. In multi-zone operation, more than one resistance heating element assembly 30 (or other supplemental thermal source) with corresponding temperature sensors 28 are electrically connected to the controller 10. The controller 10 scans the zones 50 and sets each heating element assembly 30 (supplemental thermal source) individually for the desired rate of temperature change via the microcontroller 12. Ultimately, rooms within a particular zone 50 can have a plurality of individual temperature sensors 28 and their outputs can be averaged for determining the proper source of heating or cooling needed. In any event, the controller 10 has capacity to receive multiple temperature sensor 28 inputs from a plurality of zones and to adjust the supplemental thermal sources 30 in any manner desired based on the inputs. In this embodiment, the controller 10 uses the same temperature measuring circuits shown in FIGS. 3 and 4 but will have modified system software 100 and minor adjustments made to the hardware logic.

The supplemental temperature controller 10 of the instant invention is entirely solid state with no moving parts. The heart of the controller 10 is the microcontroller 12 which preferably comprises a microcomputer or processor on a single chip programmed with processor readable medium of program code 100. It allows the system to accomplish the complex functions required at a moderate cost. The interface between the signal conditioning circuit, the temperature sensing assembly, the temperature response assembly and the microcontroller 12 comprises optical coupling which isolates the microcontroller circuit from the heating element power circuits (i.e. temperature response assembly). The supplemental thermal source or element 30 switching preferably takes place when there is no current flowing through them. This greatly extends the life of the components.

The electronic control unit 11 includes the microcontroller 12 and the main components of the system 10. The electronic control unit 11 determines the temperature of the air in the return duct R, or zone 50, by receiving temperature related signals from prearranged temperature sensors 28. For illustrative purposes, the range of temperature control is shown to be 55 to 80 degrees Fahrenheit, but may comprise any range selected by the designer. The range selected herein is applicable in most situations and with most heat pump systems. The preferred temperature sensor 28 is solid state and has an output of ten (10) millivolts per degree Fahrenheit. The first differential amplifier 14 has a constant 550 millivolt input which is subtracted from the temperature sensor input $T_D$. The first differential 14 drives the output voltage $V_O$ to zero when the return duct "R" temperature is below 55 degrees Fahrenheit. The gain of the amplifier 14 is set so that the output reaches saturation at an input corresponding to 80 degrees Fahrenheit.

The temperature of the duct $T_D$ is read and the output $V_O$ is converted to digital code by the D/A converter 16 and inputed to the microcontroller 12. This value $V_O$ is stored and later fed to the external D/A converter 20 for analog conversion. The output of the D/A converter 20 comprises $V_O$ plus an Error "E" ($V_O$+E). This output is amplified by the amplifier 19 and applied to the differential input of the second differential amplifier 18. The original output $V_O$ from the first differential amplifier is also applied to the other input of the second differential amplifier 18 so that the two inputs subtract. The first relative temperature reading TA is read at the output of the second amplifier 18 and is equal to the error signal E amplified. The microcontroller 12 automatically reduces the amplitude of the error E by adjusting the input to the external D/A convertor 20. The amplitude is reduced to a level which insures that the second differential amplifier 18 always operates in a linear region. A predetermined measurable period of time later a second reading TB is read at the output of the second differential amplifier 18. The second reading TB is equal to the reduced value of E plus the temperature difference. The microcontroller 12 via program code 100 subtracts the first reading TA from the second reading TB and the resulted number is equal to the temperature difference as the remaining errors are cancelled. This temperature difference divided by the known predetermined time provides the rate of temperature change in the relevant zone 50. This rate of temperature change is compared to preselected high and low limits for determining whether to activate or deactivate supplemental elements 30 as shown in FIG. 5.

The instant invention 10 is designed for universal use in various systems. The thermal system controller 10 is especially economical and desirable in extremely hot regions where central air conditioning systems are used almost exclusively and the more expensive heat pumps are not practical. As the amount of heating required in these regions is minimal, central air conditioners exclusively employ electrical heating elements 30 in the supply ducts "S" to meet any heating needs. A fan blows over the electrical resistance heating elements 30 while the air conditioner compressor is turned off. The problems that exist with heating elements in these systems are similar to those experienced in heat pump systems with single stage heating. The supplemental thermal control system 10 is tailored for enhancing comfort and improving efficiency of operation of the supplemental sources of heat for these types of systems.

Electrical resistance heating elements 30 are also used to supplement other types of heat in industrial and commercial installations where precise temperature control is required. In large industrial systems, multiple sensors 28 are preferably installed in the return ducts, one for each zone, and control may be independently achieved for each zone 50 with individual controllers or with a main multi-zone controller 10. The controller 10 is designed for use with multiple sensing devices 28 and can be programmed for averaging sensor inputs.

The controller 10 is adaptable for most system applications by making minor modifications to the software and/or hardware. As noted above, the temperature of the air in the return duct R or zone 50 is monitored and the source of conditioned air is controlled to produce a specified rate of temperature change. The temperature of conditioned air in hydronics can also be controlled by these methods. It can be controlled by varying the size of the radiator or convection surfaces, changing the volume of air flow across the surfaces, varying fan speed, varying the level of resistance elements or modulating the combustion of organic materials. In hydronics systems, the amount of heating or cooling can also be regulated by changing the temperature of the water source.

The following discussion illustrates how the instant invention operates with a heat pump system in the heat mode. The processor readable program code 100 is processed by the microcontroller 12 and generally comprises the steps shown in FIG. 5. When power is applied to the electronic control unit 11, the operating system 100 sets the initial conditions, the restart bits for instrumentation, and the output bits used for indicating the number of operating zones, clears all elements including the quick response indicator light (102–103) and checks to see if any thermostat is calling for heat (104). The system also checks to see if the main system is in the heat mode. If the thermostat is not calling for heat, then the heating elements remain disconnected and the system continues to loop and look for a thermostat calling for heat. When one or more of the thermostats call for heat, the electronic control unit 11 determines whether a supplemental heat source 30 is needed. This is done if the system fan is on and the quick response switch has not been activated. When the cycle begins, the last known resistance heating elements setting is selected and activated for the current combination of zones 50 (105). If no elements 30 where previously used, then it is an indication that the heat pump was able to satisfy the heating requirements alone. The typical heating element assembly 30 which is common to all zones 50 can be divided into a plurality of equal increments of heating by digital selection. After the appropriate resistance heating element value is chosen, there is a predetermined time delay (delay 1–T1) to allow the transients to stabilize (106). This delay could be any value and is typically thirty (30) to ninety (90) seconds. During the time delay T1, the program 100 and electronic control unit 11 checks to see if the main system fan is on, whether the quick response switch is actuated, the status of any zone change and whether all zones are off. If the fan is "off", or if all zones are "off", then the program code 100 resets all bits and conditions and loops back to the beginning. If the quick response switch 26 is in the "on" position then all elements 30 are brought in before resuming normal operation.

Following the foregoing status checks, the temperature of the air in the return duct is measured (107) and if it is below 55 degrees Fahrenheit one element 30 increment is added (110). The result is stored in memory 13 for that combination of zones 50 in use and the system recycles back to the beginning (112). If the temperature is above 80 degrees then element 30 is removed or subtracted and the above process is repeated (111–112). If the system attempts to subtract an element when none is in, or add an element when all are in, no change will take place.

When TD is between 55 and 80 degrees Fahrenheit, the first reading of relevant temperature TA is read (113). It is fed to an amplifier which is compensated to read only true differential temperature (113). After a second predetermined time delay (T2) a second relative reading (TB) is made (114–115). The two temperature readings TA, TB are subtracted canceling all errors (116) as discussed above. The difference is then compared to high and low limits (117–120). If the difference is greater than the high limit then an element 30 is removed, and if the difference is less than or equal to the lower limit than an element is added. More specifically, if the second reading Tb is less than or equal to the prior reading Ta, one element 30 is added and the results are stored for that combination of zones being used. The system then recycles back to the beginning. In the situation when the second reading Tb is less than the first reading Ta, an element 30 is added. If the second reading Tb is greater than the prior reading Ta than the difference is compared to a high limit. If it is above the high limit when one element is subtracted, the new value is stored and the system recycles. If it is below the high limit, then it is compared to low limit. If it is below the low limit, then one element is added and the system again recycles. If the difference is between the limits, the system cycles again from the beginning retaining the proper value of active elements.

The time for a complete correction cycle is about 1½ minutes. The first and second time delays T1 and T2 provide a managed rate of temperature change and detection to accommodate the actual heat loss of the building. T1 insures that all thermal transcients are stabilized and the temperature change has reached a steady state. T2 comprises the period used to determine the rate of temperature change. As soon as there is a change in zones, the system recycles providing continuous control. The temperature rise is set between 0.08 and 0.12 degrees Fahrenheit per minute which results in the on period of the thermostat being typically 20 minutes for a two degree temperature rise. Most often when a combination of zones 50 calls for heat, the value of resistance heating elements 30 used the last time this occurred will be applied instantly and will be correct to accomplish the desired temperature rise. If a correction is needed due to a change in heat loss in a zone 50, it will be gradual and will usually require a single 90 second adjustment. The rate of temperature rise, the limits and the duration of a delay can be adjusted if experience indicates this to be desirable. In addition, the temperature settings may be changed and may comprise any desirable unit.

The fan, thermostat and the position of the quick response switch 26 are continuously monitored during each delay. If the fan is not running or if there is a change in the combinations of thermostats calling for heat, the system 10 will recycle and repeat the entire procedure immediately. If the quick response 26 is found to be "on", the system 10 will respond again immediately. The clock frequency of the microcontroller 12 is one megacycle but may be otherwise. All logic is performed in the microsecond time frame and for all practical purposes is instantaneous.

In the momentary quick response switch 26 is pressed, the quick response light will light and all the heating elements 30 will be activated. They will remain active until no thermostat is calling for heat, at which time the quick response light will go out and the system will resort back to the normal mode of operation. If electronic thermostats are used, the quick response mode can be activated automatically if the set temperature differs from the room temperature by specified amount. A voltage proportional to the set temperature must be available.

The various applications for the controller 10 are shown in FIGS. 6 and 7 and are discussed below:

HEAT PUMP, AIR DUCT SYSTEM, HEAT AND COOL MODES (5)

The temperature of the air in the return duct or air in a zone is monitored and the controller will regulate the air flow entering a zone to produce a controlled rate of temperature increase or decrease under all normal operating conditions.

HEAT PUMP, AIR DUCT SYSTEM, HEAT MODE (1)

The temperature of the air in the return duct or air in a zone is monitored and the controller will regulate the valve of the supplementary resistance elements to produce a controlled rate of temperature increase under low outside temperature conditions.

HEAT PUMP, HYDRONIC SYSTEM, HEAT AND COOL MODE (3)

The temperature of the air in a zone is monitored and the controller will regulate the temperature of the water, the convector surface area, or the air flow over the convector to produce a controlled rate of temperature increase or decrease under all operating conditions.

AIR CONDITIONER, AIR DUCT SYSTEM, AUXILIARY HEATING MODE (2)

The temperature of the air in a return duct or air in a zone is monitored and the controller will regulate the value of the auxiliary heating elements to produce a controlled rate of temperature increase under all operating conditions.

AIR CONDITIONING, AIR DUCT SYSTEM, COOLING MODE (5)

The temperature of the air in a return duct or air in a zone is monitored and the controller will regulate the air flow entering a zone to produce a controlled rate of temperature decrease under all operating conditions.

OIL OR GAS FIRED FURNACE, HYDRONIC SYSTEM, HEATING MODE (4)

The temperature of the air in a zone is monitored and the controller will regulate the temperature of the water, the convector surface area, or the air flow over the convector to produce a controlled rate of temperature increase under all operating conditions.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A supplementary thermal system controller for assisting a main air temperature control system in maintaining a desired air temperature in at least one zone by communicating with at least one corresponding temperature sensor, wherein the main air temperature control system includes a duct system having a supply duct and a return duct for routing the air medium through the zone and situating the temperature sensors, a circulation means for circulating air through the ducts, a supplemental thermal source, in thermal communication with said circulation means and the air medium, for providing a secondary thermal output to the air medium to assist in maintaining the desired air temperature and a thermostat responsive to the temperature of the circulated air so as to activate the main air temperature control system when the air temperature passes a predetermined desired temperature setpoint, said controller comprising:

(a) a microcontroller for reading and processing a processor readable medium of program code and being in electrical communication with the thermostat for being activated by the thermostat together with the main air temperature control system;

(b) a signal conditioner circuit in electrical communication with said microcontroller and at least one temperature sensor for receiving and electrically communicating temperature related signals generated by the temperature sensor with said microcontroller, said signals providing successive temperature measurements of the air medium in the return duct;

(c) processor readable medium of program code in electrical communication with said successive return duct temperature measurements, said program code comprising:

processing means for reading said return duct temperature measurements and determining the rate of temperature change of the air medium in the return duct from said successive return duct temperature measurements;

comparison means, in communication with said processing means, for comparing said successive return duct temperatures with predetermined thresholds; and energizing means, in communication with said comparison means, for selectively generating control signals based on the relationship of the return duct temperature measurements to said thresholds to selectively energize the supplemental thermal source while the desired temperature is being achieved; and (d) a supplemental thermal source driver, in electrical communication with said energizing means, for adjusting the secondary thermal output of the supplemental thermal source in response to said control signals.

2. A controller as recited in claim 1, wherein said processing means further comprises:

difference means for deriving a return duct temperature difference between said successive return duct temperature measurements over a predetermined period of time, said difference means being in communication with said comparison means for comparing said return duct temperature difference to selected predetermined thresholds.

3. A controller as recited in claim 1, wherein said energizing means further comprises:

a first control signal means for generating a first control signal that adjustably increases the secondary thermal output of the supplemental thermal source; and a second control signal means for generating a second control signal that adjustably decreases the secondary thermal output of said supplemental thermal source.

4. A controller as recited in claim 1, wherein said signal conditioner circuit comprises:

an amplifier means for amplifying said return duct temperature related signals; and an analog-to-digital converter for converting said return duct temperature related signals from analog to digital for communicating with said microcontroller.

5. A controller as recited in claim 1, wherein said signal conditioner circuit comprises:

a differential amplifier means, in electrical communication with the temperature sensors, for receiving said return duct temperature related signals at a first input and a constant voltage at a second input and producing an output proportional to the difference between said first and second inputs, said constant voltage corresponding to said predetermined thresholds.

6. A controller as recited in claim 1, wherein said differential amplifier means is designed to saturate when said return duct temperature related signal exceeds a predetermined voltage.

7. A controller as recited in claim 1, wherein said program code further comprises:

recall means, in electrical communication with said supplemental thermal source driver, for automatically setting said supplemental thermal source driver at a last known setting when starting said controller after a predetermined period of time so that the supplemental thermal source produces the last known secondary thermal output.

8. A controller as recited in claim 7, further comprising a memory means, in electrical communication with said microcontroller and said recall means, for selectively storing said return duct temperature measurements and said last known setting secondary thermal output.

9. A controller as recited in claim 1, further comprising at least one temperature sensor in electrical communication with said signal conditioning circuit.

10. A controller as recited in claim 1, further comprising a quick response switch for automatically setting said supplemental thermal source driver to a predetermined position that causes the supplemental thermal source to provide a predetermined amount of secondary thermal output.

11. A supplementary heating system controller for assisting a main heating system in maintaining a desired air temperature in at least one zone by communicating with at least one corresponding temperature sensor, wherein the main heating system includes a duct system having a supply duct and a return duct for routing the air medium through the zone and situating the temperature sensors, a circulation means for circulating air through the ducts, a supplemental heating source, in thermal communication with said circulation means and the air medium, for providing a secondary heating output into the air medium to assist in maintaining the desired air temperature and a thermostat responsive to the temperature of the circulated air so as to activate the main heating system when the air temperature falls below a predetermined desired temperature setpoint, said controller comprising:

(a) a microcontroller for reading and processing a processor readable medium of program code and being in electrical communication with the thermostat for being activated by the thermostat together with the main heating system;

(b) a signal conditioner circuit in electrical communication with said microcontroller and at least one temperature sensor for receiving and electrically communicating temperature related signals generated by the temperature sensor with said microcontroller, said signals providing successive temperature measurements of the air medium in the return duct;

(c) processor readable medium of program code in electrical communication with said successive return duct temperature measurements, said program code comprising:

processing means for reading said return duct temperature measurements and determining the rate of temperature change of the air medium in the return duct from said successive return duct temperature measurements;

comparison means, in communication with said processing means, for comparing said rate of temperature change with a high limit and a low limit; and energizing means, in communication with said comparison means, for selectively generating a first control signal when the rate of temperature change falls below said low limit to selectively increase the secondary heating output of the supplemental heating source, and for selectively generating a second control signal when the rate of temperature change exceeds said high limit to selectively decrease the secondary heating output of the supplemental heating source; and (d) a supplemental heating source driver, in electrical communication with said energizing means, for adjustably energizing and deenergizing the supplemental heating source in response to said control signals.

12. A controller as recited in claim 11, wherein said processing means further comprises:

difference means for determining the rate of temperature change by deriving a return duct temperature difference between said successive return duct temperature measurements over a predetermined period of time, said difference means being in communication with said comparison means for comparing said return duct temperature difference to said high limit and said low limit.

13. A controller as recited in claim 12, wherein said signal conditioner circuit comprises:

an amplifier means, electrically communicating said microcontroller with said return duct temperature related signals, for amplifying said return duct temperature related signals; and an analog-to-digital converter, electrically communicating said amplifier means with said microcontroller, for converting said return duct temperature related signals from analog to digital for communicating with said microcontroller.

14. A controller as recited in claim 12, wherein said signal conditioner circuit comprises:

a differential amplifier means, in electrical communication with the temperature sensors, for receiving said return duct temperature related signals at a first input and a predetermined constant voltage at a second input and producing an output proportional to the difference between said first and second inputs.

15. A controller as recited in claim 14, wherein said program code further comprises:

bypass means, in electrical communication with said differential amplifier means, for bypassing said comparison means and said difference means and jumping to said energizing means when said return duct temperature measurement falls outside a predetermined window, said window having a low temperature threshold and a high temperature threshold, said constant voltage corresponding to said low temperature threshold, said energizing means generating said first control signal when said return duct temperature measurement falls below said low temperature threshold to increase the secondary heating output, and generating said second control signal when said return duct temperature measurement exceeds said high limit to decrease the secondary heating output.

16. A controller as recited in claim 15, further comprising at least one temperature sensor in electrical communication with said signal conditioning circuit.

17. A controller as recited in claim 16, wherein said supplemental heating source driver causes the supplemental heating source to increase resistance heating in response to said first control signal and decrease resistance heating in response to said second control signal when the supplemental heating source comprises an electrical resisting heating element assembly.

18. A controller as recited in claim 17, further comprising an electrical resistance heating assembly wherein the supplemental thermal source comprises said electrical resistance heating assembly.

19. A controller as recited in claim 15, wherein said differential amplifier means is designed to saturate when said return duct temperature related signal exceeds a predetermined voltage, said predetermined voltage corresponding to said high temperature threshold.

20. A controller as recited in claim 15, wherein said program code further comprises:

recall means, in electrical communication with said supplemental heating source driver, for automatically setting said supplemental heating source driver at a last known setting when predetermined conditions are satisfied so that the secondary heating output initially starts at the last known setting.

21. A controller as recited in claim 20, further comprising a memory means, in electrical communication with said microcontroller and said recall means, for selectively storing said return duct temperature measurements and said last known setting.

22. A controller as recited in claim 11, further comprising a quick response switch for automatically setting said supplemental thermal source driver to a maximum position that causes the supplemental heating source to provide a maximum secondary heating output.

23. A method for assisting a main heating system in maintaining a desired air temperature in at least one zone by communicating with at least one corresponding temperature sensor, wherein the main heating system includes a duct system having a supply duct and a return duct for routing the air medium through the zone and situating the temperature sensors, a circulation means for circulating air through the ducts, a supplemental heating source, in thermal communication with said circulation means and the air medium, for providing a secondary heating output to the air medium to assist in maintaining the desired air temperature and a thermostat responsive to the temperature of the circulated air so as to activate the main heating system when the air temperature falls below a predetermined desired temperature setpoint, said method comprising the steps of:

(a) measuring the temperature of the air medium in the return duct to derive a return duct temperature measurement;

(b) comparing said return duct temperature measurement to a low temperature threshold and a high temperature threshold;

(c) increasing the secondary heating output when said return duct temperature measurement falls below said low temperature threshold and decreasing said secondary heating output when said return duct temperature exceeds said high temperature threshold;

(d) deriving a difference between successive return duct temperature measurements when said return duct temperature measurement falls between said low temperature threshold and said high temperature threshold; and (e) comparing said difference to a high limit and decreasing the secondary heating output when said difference exceeds said high limit, and comparing said difference to a low limit and increasing the secondary heating output when said difference falls below said low limit.

24. A method as recited in claim 23, further comprising the step of storing the secondary heating output.

* * * * *